No. 100,456. PATENTED MAR. 1, 1870.
E. P. SCHUTT.
GAS OR WATER PIPE PLUG.
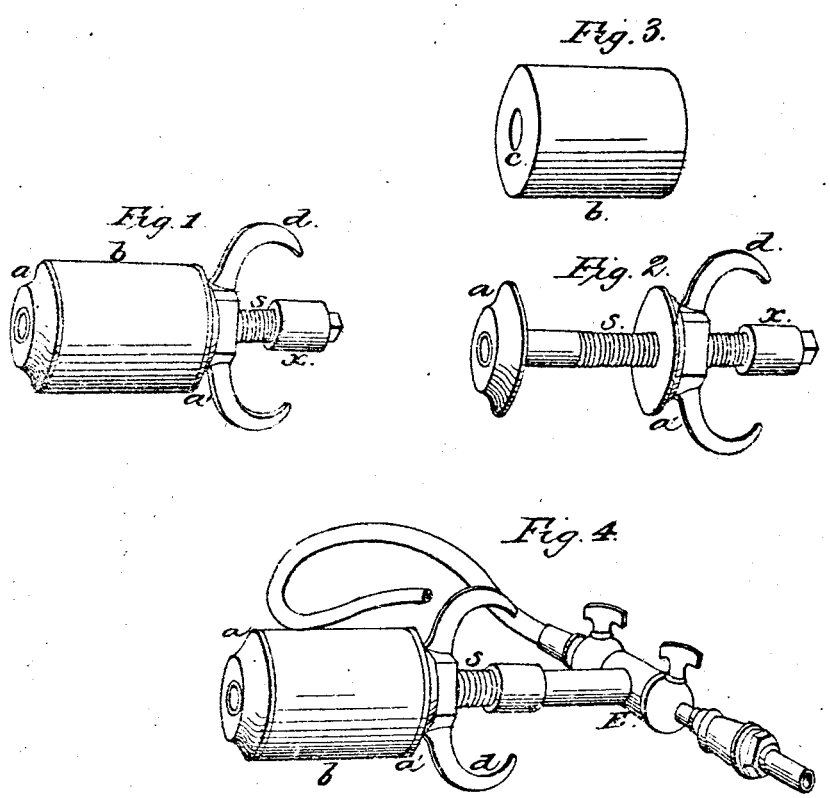
Witnesses:
Arthur Holmes
Henry Cummings
Inventor:
Everett P. Schutt

UNITED STATES PATENT OFFICE.

EVERETT P. SCHUTT, OF CORTLAND, NEW YORK.

IMPROVEMENT IN GAS AND WATER PIPE PLUG.

Specification forming part of Letters Patent No. 100,456, dated March 1, 1870

*To all whom it may concern:*

Be it known that I, EVERETT P. SCHUTT, of Cortland, in the county of Cortland, in the State of New York, have invented a new and Improved Gas and Water Pipe Plug; and I do hereby declare that the following is a full and exact description thereof, reference being had to the accompanying drawings and to the letters of reference marked thereon.

Figure 1 shows the plug with parts combined; Fig. 2, same with rubber detached; Fig. 3, rubber independent of other parts; Fig. 4, the apparatus attached to a pump.

To enable others skilled in the art to make and use my invention, I will proceed to describe its construction and operation.

I construct my gas and water pipe plug by making the body $b$ of hard rubber, or any other elastic or pliable material of sufficient substance to answer the uses required. Its size is dependent on the diameter of the hole of the pipe in which it is to be used. The most convenient form is a cylinder some two inches (more or less) in length, and with a diameter of its end nearly equal to the length of the cylinder. Through the rubber, at $c$, I put a small gas-pipe, $s$, cut with a thread at either end, and attach the washers $a\ a'$, of size suited to the object in view, and to fairly cover the end of the rubber $b$. Following $a'$ is a nut, $d$, made to be turned by the hand or other agency.

The operation of my invention is simple: In applying the gas-pipe I take the plug, Fig. 1, insert it in the end of the pipe, turn up the nut $d$, and the pressure of the washer $a'$ enlarges the diameter of the elastic $b$, and the nut is turned until the plug is made sufficiently tight. The cap $x$ is then removed, and the pump at $e$ attached in its place. A similar plug, with a rubber-packed cap, $x$, may be inserted in the opposite end of the pipe to be tested, and it is prepared for the trial test.

The advantage of my invention for proving gas-pipes is clear.

Under the old mode the ends were stopped with wooden plugs, a hole then drilled through the pipe, and the trial-pump applied to the hole so made.

I can apply my invention in less than one moment's time, and the trial may be completed before the pipe could be drilled. It may be removed as easily as applied, while the old plug must often be burned out. I apply it to all sizes of gas-pipe.

My invention is equally as efficient in constructing water-works, and in any use where liquids, fluids, gas, &c., are desired to be regulated.

In the place of the small gas-pipe I use any equivalent, as an ordinary bolt, regard being had to the use to which it is designed.

What I claim as my invention, and desire to secure by Letters Patent, is—

The gas and water pipe plug, as a new article of manufacture, substantially as described.

EVERETT P. SCHUTT.

Witnesses:
ARTHUR HOLMES,
HENRY CUMINGS.